United States Patent
Hirano et al.

(10) Patent No.: US 7,755,603 B2
(45) Date of Patent: Jul. 13, 2010

(54) COORDINATE INPUT DEVICE

(75) Inventors: Shinji Hirano, Tokyo (JP); Yasunari Takano, Tokyo (JP); Shigetoshi Amano, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 1092 days.

(21) Appl. No.: 11/132,666

(22) Filed: May 19, 2005

(65) Prior Publication Data
US 2005/0259073 A1    Nov. 24, 2005

(30) Foreign Application Priority Data
May 24, 2004   (JP)  ............... 2004-153158
Aug. 6, 2004    (JP)  ............... 2004-230430

(51) Int. Cl.
  *G09G 5/00*  (2006.01)
(52) U.S. Cl. ............................ 345/156; 345/161
(58) Field of Classification Search ................. 345/156, 345/157–161
See application file for complete search history.

(56) References Cited

U.S. PATENT DOCUMENTS

| | | | |
|---|---|---|---|
| 4,469,330 A * | 9/1984 | Asher | 463/38 |
| 6,059,660 A * | 5/2000 | Takada et al. | 463/38 |
| 6,448,957 B1 * | 9/2002 | Chia-Hung | 345/161 |
| 2003/0016209 A1 * | 1/2003 | Narusawa et al. | 345/168 |
| 2003/0066739 A1 * | 4/2003 | Rickenbach et al. | 200/5 R |
| 2003/0218598 A1 * | 11/2003 | Shibata | 345/161 |
| 2004/0055862 A1 * | 3/2004 | Nam | 200/512 |
| 2004/0056841 A1 * | 3/2004 | Slotta | 345/161 |

FOREIGN PATENT DOCUMENTS

JP   A-9-230999   9/1997

* cited by examiner

*Primary Examiner*—Amare Mengistu
*Assistant Examiner*—Insa Sadio
(74) *Attorney, Agent, or Firm*—Brinks Hofer Gilson & Lione

(57) ABSTRACT

A coordinate input device of the present invention includes a base having a deformation sensor; a stick that stands upright with a specified height from the base; a rubber cap that can be press-fitted on the stick; and a pressure sensor that can be controlled by pushing a control section formed at the upper end of the rubber cap. The rubber cap has a dome-shaped cavity in the control section. When the control section is pushed, the cavity is elastically deformed to make the pressure sensor operative.

22 Claims, 10 Drawing Sheets

COORDINATE INPUT DEVICE

This application claims the benefit of priority to Japanese Patent Application No. 2004-153158 filed on May 24, 2004 and 2004-230430 filed on Aug. 6, 2004, both herein incorporated by reference.

BACKGROUND OF THE INVENTION

1. Field of the Invention

The present invention relates to a coordinate input device, and in particular, it relates to a coordinate input device capable of inputting desired coordinates by controlling the inclination of a stick and capable of inputting other coordinates by pushing a rubber cap that is press-fitted in the stick.

2. Description of the Related Art

A related-art coordinate input device will be described with reference to Japanese Unexamined Patent Application Publication No. 09-230999. As shown in FIG. 20, a related-art coordinate input device 51 includes a base 52 and a stick 53 that stands upright from the base 52, and has a deformation sensor (not shown) bonded to the side of the stick 53.

The stick 53 has first, second, and third holes 53a, 53b, and 53c. The stick 53 has a specified-diameter recess 53d on the upper end.

A driving pin 54 passes through the first hole 53a. The driving pin 54 includes a head 54a with a large outside diameter, a columnar part 54b that can be fitted in the first hole 53a, and a hook-shaped engaging portion 54c formed at the lower end of the columnar part 54b.

A spring support member 55 that moves vertically with the vertical motion of the driving pin 54 is in engagement with the engaging portion 54c of the driving pin 54.

The spring support member 55 has a compression spring 56. The compression spring 56 is disposed such that the lower end is elastically in contact with a dome-shaped metal contact 57. Under the metal contact 57, a membrane sheet 58 is disposed which has opposing upper and lower contacts 58a with a gap therebetween.

A rubber cap 59 is fixed to the head 54a of the driving pin 54. When the rubber cap 59 is pushed downward, the driving pin 54 moved downward and as such, the spring support member 55 compresses the compression spring 56 to push the metal contact 57.

Then the dome-shaped metal contact 57 is reversed, and so the upper contact 58a of the membrane sheet 58 moves downward to come into contact with the lower contact 58a to allow conduction.

When a tilting load is applied to the rubber cap 59 from an obliquely upward position and from the side, the stick 53 is tilted via the driving pin 54.

The tilting of the stick 53 is detected by the deformation sensor (not shown) bonded to the side of the stick 53.

The related-art coordinate input device 51 is disposed between multiple key switches of, e.g., a keyboard input device (not shown) to allow desired coordinate inputting when a pushing load or tilting load is applied to the rubber cap 59 by the fingers of an operator.

However, the related-art coordinate input device 51 has the problem of bad feeling of operation when inputted since the driving pin 54 operates the metal contact 57 indirectly via the compression spring 56 to cause a slight time lag.

Also, it has the problem of slight feeling of clicking that is transmitted to the fingers of the operator because the feeling of clicking generated when the metal contact 57 is reversed is transmitted to the fingers of the operator via the compression spring 56.

The related-art coordinate input device 51 also has the problem of a large height, thus obstructing a low profile.

SUMMARY OF THE INVENTION

Accordingly, it is an object of the present invention to provide a low-profile coordinate input device that can provide the operator with preferable large feeling of clicking.

According to a first aspect of the invention, there is provided a coordinate input device including: a base having a deformation sensor; a stick that stands upright with a specified height from the base; a rubber cap that can be press-fitted on the stick; and a pressure sensor that can be controlled by pushing a control section formed at the upper end of the rubber cap. The rubber cap has a dome-shaped cavity in the control section. When the control section is pushed, the cavity is elastically deformed to make the pressure sensor operative.

Preferably, the coordinate input device further includes a dome-shaped metal contact disposed on the pressure sensor; and a driving pin supported by the stick, the driving pin capable of pushing the pressure sensor. When the control section of the rubber cap is pushed, the driving pin is pushed by the elastic deformation of the cavity to reverse the metal contact.

Preferably, the stick has a support hole for the driving pin to pass through, wherein when the rubber cap is pushed, the driving pin is slid in the support hole.

Preferably, the stick holds a cap support member that supports the lower end of the rubber cap, wherein when the control section is pushed, the lower end of the rubber cap is prevented from moving downward by the cap support member.

Preferably, the stick is shaped in the form of a square pole; and the cap support member has side plates that can hold the outer wall of the square-pole stick, the side plates being integrated with a support plate that can support the lower end of the rubber cap.

Preferably, the outer wall of the stick has projections that can be fitted in locking holes formed in the side plates of the cap support member.

Preferably, the rubber cap has an engage hole that can be press-fitted on the stick; and the projections project by a specified length from the locking holes of the cap support member mounted to the stick.

Preferably, the driving pin has a columnar part, part of the outer circumference of the columnar part being projected to form projections; and the cap support member has a through hole for the columnar part of the driving pin to pass through. The driving pin whose columnar part is passed through the through hole is prevented from coming off by the projections.

Preferably, the driving pin has a control surface that is in contact with the ceiling of the cavity of the rubber cap, the size of the control surface being larger than the outside diameter of the columnar part.

Preferably, the control surface is a controller separate from the driving pin. A connecting portion of the controller is press-fitted in a press-fit hole of the driving pin to integrate the driving pin with the controller.

Preferably, the stick has slide grooves on the diagonals of the square pole, for the projections of the driving pin to be slidably fit in.

Preferably, the driving pin is made of resin.

Preferably, the rubber cap has a groove with a specified width and depth at the lower end.

Preferably, the control section of the rubber cap has a specified-height projection at the part facing the control surface of the controller integrated with the driving pin.

According to a second aspect of the invention, there is provided a coordinate input device including: an input member having a deformation sensor; a rubber cap that can be press-fitted on the stick projecting with a specified height from the base of the input member; and a pressure sensor that can be controlled by pushing a control section of the rubber cap. The rubber cap is slidably supported by the stick and when the control section of the rubber cap is pushed, the rubber cap is slid along the stick to make the pressure sensor operative.

Preferably, the coordinate input device further includes a dome-shaped metal contact disposed on the pressure sensor; and a driving pin supported by the stick, the driving pin being capable of pushing the pressure sensor. When the rubber cap is slid by the pressure, the driving pin is also slid to reverse the metal contact.

Preferably, the stick has a support hole for the driving pin to pass through, wherein when the rubber cap is pushed, the driving pin is slid in the support hole.

Preferably, the stick holds a cap support member that supports the rubber cap, wherein when the rubber cap is pushed, the rubber cap is slid along the stick via the cap support member.

Preferably, the stick is shaped in the form of a square pole; the cap support member has a stick holding portion that can be slid along the stick while holding the outer walls of the stick; and the rubber cap has a press-fit hole that can be fitted on the stick holding portion.

Preferably, the cap support member is made of a metal plate; and the stick holding portion can hold the outer walls of the stick by a plurality of bent side plates.

Preferably, each of the outer walls of the stick has a projection that is slidably fitted in the locking hole in each of the plurality of side plates of the stick holding portion.

Preferably, each of the plurality of side plates of the stick holding portion has a projection for preventing coming off of the rubber cap fitted on the press-fit hole.

Preferably, the driving pin has a columnar control shaft slidably supported by the support hole of the stick and capable of pushing the metal contact, and a pressure control section with a diameter larger than that of the control shaft, the pressure controller having projections that project from part of the outer circumference, the cap support member having a through hole for the pressure control section to partly pass through, wherein the driving pin is prevented from coming off from the through hole by the projections.

Preferably, the pressure controller of the driving pin has a control surface that is in contact with the ceiling of the press-fit hole of the rubber cap, the size of the control surface being larger than the outside diameter of the pressure controller.

Preferably, the control surface is a controller separate from the driving pin. A press-fit portion of the controller is press-fitted in a press-fit hole of the driving pin to integrate the driving pin with the controller.

Preferably, the stick has guide grooves on the diagonals of the square pole, for the projections of the driving pin to be slidably fit in.

The rubber cap of the coordinate input unit according to an embodiment of the invention has a dome-shaped cavity in the control section. When the control section is pushed, the cavity is elastically deformed to make the pressure sensor operative. Accordingly, the control section can be elastically deformed by a slight pressure owing to the cavity, so that a use-of-ease coordinate input unit can be provided.

A dome-shaped metal contact is disposed on the pressure sensor; and a driving pin capable of pushing the pressure sensor is supported by the stick. When the control section of the rubber cap is pushed, the driving pin is pushed by the elastic deformation of the cavity to reverse the metal contact. Accordingly, the metal contact can be pushed directly by the driving pin, allowing the user to recognize the feeling of clicking generated by the reverse directly through the driving pin, so that a higher controllable coordinate input unit can be provided.

The stick has a support hole for the driving pin to pass through, wherein when the rubber cap is pushed, the driving pin is slid in the support hole. Accordingly, the pressure applied to the rubber cap can be applied to the metal contact without loss.

The stick holds a cap support member that supports the lower end of the rubber cap, wherein when the control section is pushed, the lower end of the rubber cap is prevented from moving downward by the cap support member. Accordingly, when the reversed metal plate is restored to the initial state, the load of the rubber cap is not applied to the driving pin. The driving pin is therefore restored reliably and speedy to the initial state before operation.

The stick is shaped in the form of a square pole; and the cap support member has side plates that can hold the outer wall of the square-pole stick, the side plates being integrated with a support plate that can support the lower end of the rubber cap. Accordingly, the lower end of the rubber cap which is press-fitted on the stick via the cap support member can be supported by the support plate, so that the downward movement of the rubber cap can be controlled reliably.

The outer wall of the stick has projections that can be fitted in locking holes formed in the side plates of the cap support member. Accordingly, the cap support member can be locked to the stick securely by fitting the projections in the locking holes.

The rubber cap has an engage hole that can be press-fitted on the stick; and the projections project by a specified length from the locking holes of the cap support member mounted to the stick. Accordingly, when the rubber cap is press-fitted on the stick, the projections dig into the inner surface of the engage hole, thereby preventing the rubber cap from coming off from the stick.

The driving pin has a columnar part, part of the outer circumference of the columnar part being projected to form a projection; and the cap support member has a through hole for the columnar part of the driving pin to pass through. The driving pin whose columnar part is passed through the through hole is prevented from coming off by the projections. Accordingly, the driving pin can be securely supported by the stick with the cap support member. Thus, the driving pin does not project from the stick when the rubber cap is replaced, facilitating the replacement.

The driving pin has a control surface that is in contact with the ceiling of the cavity of the rubber cap, the size of the control surface being larger than the outside diameter of the columnar part. Accordingly, the control area where the driving pin is pushed can be large, providing high usability.

The control surface is a controller separate from the driving pin. A connecting portion of the controller is press-fitted in a press-fit hole of the driving pin to integrate the driving pin with the controller. This facilitates replacement of the rubber cap.

The stick has slide grooves on the diagonals of the square pole, for the projections of the driving pin to be slidably fit in. Accordingly, the driving pin can be locked by fitting the projections into the slide grooves.

Since the driving pin is made of resin, the controller can easily be press fitted therein.

Since the rubber cap has a groove with a specified width and depth at the lower end, the rubber cap can be elastically deformed by pressure not only by the cavity but also by the groove at the lower end. This increases the control stroke, thereby improving the feeling of operation.

The controller of the rubber cap has a specified-height projection at the part facing the control surface of the controller integrated with the driving pin. Accordingly, the position of the driving pin can be reliably recognized, providing reliable pushing operation.

A rubber cap of a coordinate input device according to another embodiment of the invention is slidably supported by the stick and, when the control section of the rubber cap is pushed, the rubber cap is slid along the stick to make the pressure sensor operative. Accordingly, the rubber cap can be slid while being supported by the stick. Thus, a high-usability coordinate input unit without rattle of the rubber cap when pushed can be provided.

A dome-shaped metal contact is disposed on the pressure sensor; and a driving pin is supported by the stick, the driving pin being capable of pushing the pressure sensor. When the rubber cap is slid by the pressure, the driving pin is also slid to reverse the metal contact. Accordingly, the metal contact can be pushed directly by the driving pin, allowing the user to recognize the feeling of clicking generated by the reverse directly via the driving pin, so that a higher-usability coordinate input unit can be provided.

The stick has a support hole for the driving pin to pass through, wherein when the rubber cap is pushed, the driving pin is slid in the support hole. Accordingly, the pressure applied to the rubber cap can be applied directly to the metal contact via the driving pin.

The stick holds a cap support member that supports the rubber cap, wherein when the rubber cap is pushed, the rubber cap is slid along the stick via the cap support member. Accordingly, the frictional resistance between the outer wall of the stick and the cap support member can be decreased, allowing the rubber cap to be slid smoothly.

The stick is shaped in the form of a square pole. The cap support member has stick holding portion that can be slid along the stick while holding the outer wall of the stick. The rubber cap has a press-fit hole that can be fitted on the stick holding portion. Since the rubber cap is press-fitted in the stick holding portion, the frictional resistance between the outer wall of the stick and the cap support member can be decreased, allowing the rubber cap to be slid more smoothly.

The cap support member is made of a metal plate; and the stick holding portion can hold the outer walls of the stick by a plurality of bent side plates. Accordingly, the frictional resistance between the cap support member that holds the stick and the stick can be decreased.

Each of the outer walls of the stick has a projection that is slidably fitted in the locking hole in each of the plurality of side plates of the stick holding portion. Accordingly, the cap support member can be locked on the stick by fitting the projections in the locking holes.

Each of the plurality of side plates of the stick holding portion has a projection for preventing coming off of the rubber cap fitted on the press-fit hole. Accordingly, when the rubber cap is press-fitted on the stick holding portion of the cap support member, the projections dig into the inner surface of the engage hole, thereby preventing the rubber cap from coming off from the stick holding portion.

The driving pin has a columnar control shaft slidably supported by the support hole of the stick and capable of pushing the metal contact, and a pressure control section with a diameter larger than that of the control shaft, the pressure controller having projections that project from part of the outer circumference, the cap support member having a through hole for the pressure control section to partly pass through, wherein the driving pin is prevented from coming off from the through hole by the projections. Accordingly, the driving pin can be reliably locked by the stick with the cap support member. Thus, the driving pin does not project from the stick when the rubber cap is replaced, facilitating the replacement.

The pressure controller of the driving pin has a control surface that is in contact with the ceiling of the press-fit hole of the rubber cap, the size of the control surface being larger than the outside diameter of the pressure controller. Accordingly, the control area where the driving pin is pushed can be large, providing high usability.

The control surface is a controller separate from the driving pin, wherein a press-fit portion of the controller is press-fitted in a press-fit hole of the driving pin to integrate the driving pin with the controller. This facilitates replacement of the rubber cap.

The stick has guide grooves on the diagonals of the square pole, for the projections of the driving pin to be slidably fit in. Accordingly, the driving pin can be locked by fitting the projections into the guide grooves.

DESCRIPTION OF THE PREFERRED EMBODIMENTS

Figure 1:
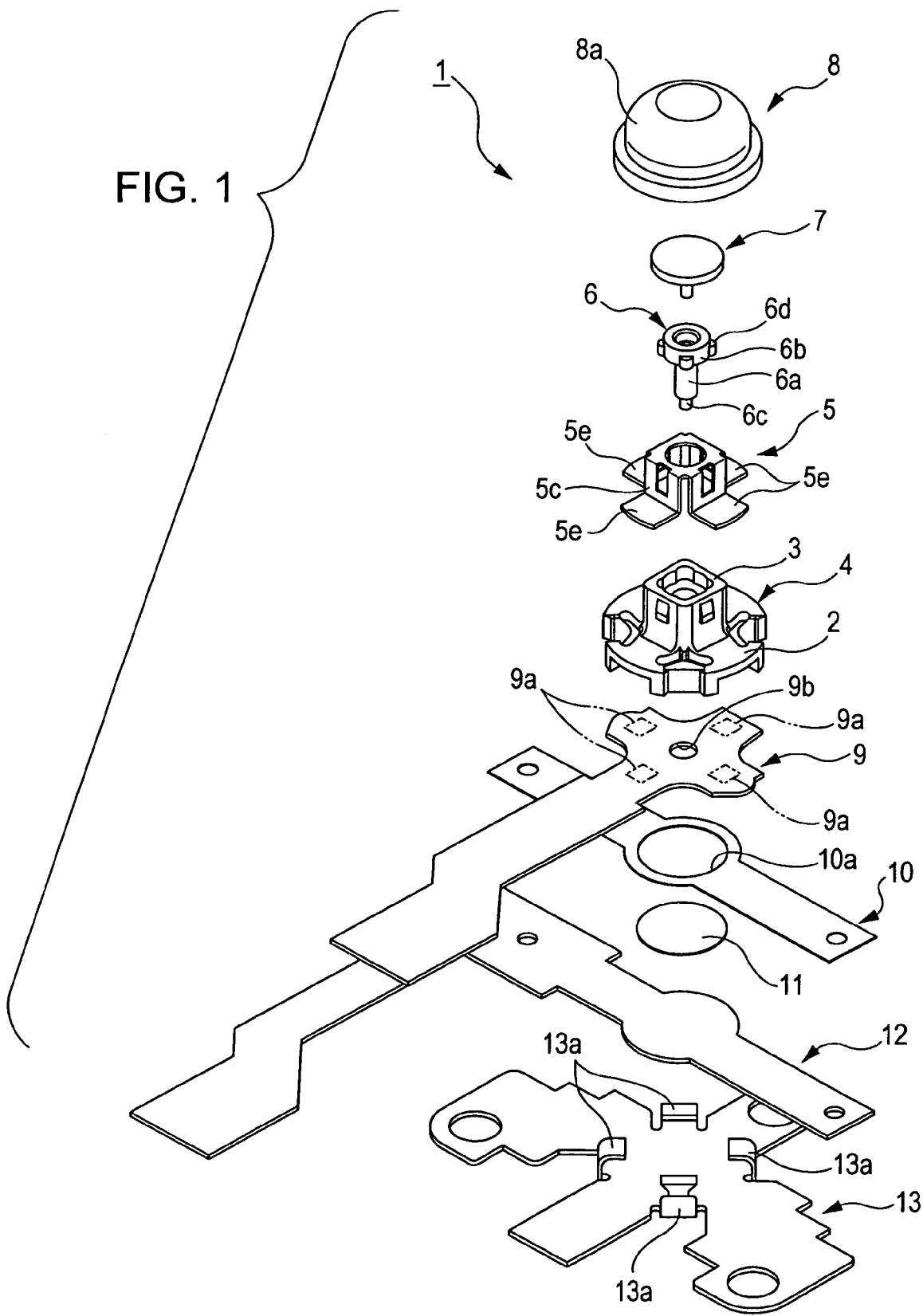
FIG. 1 is an exploded perspective view of a coordinate input device according to a first embodiment of the present invention.
Figure 2:
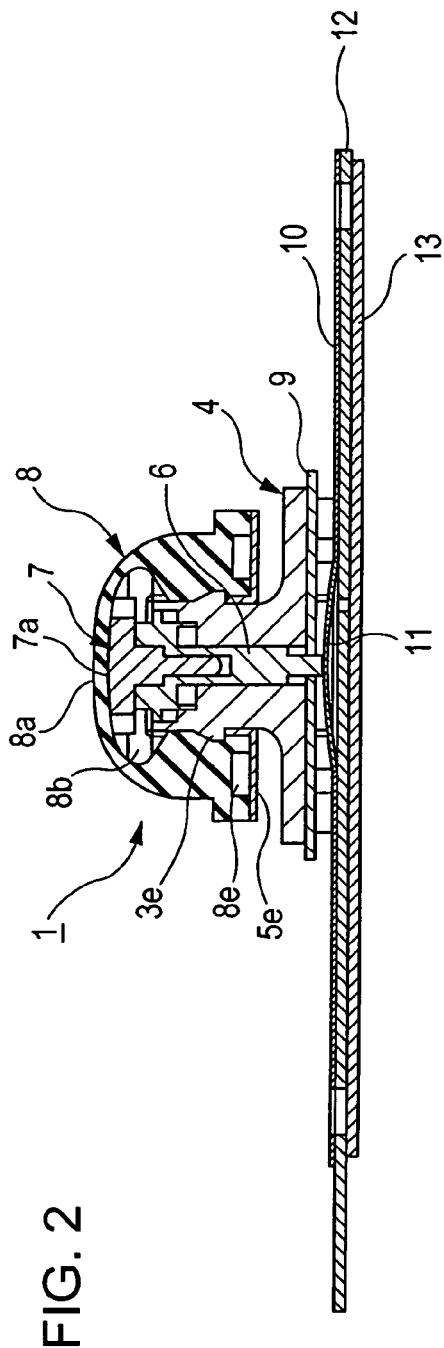
FIG. 2 is a cross-sectional view of the essential part of the coordinate input device according to the first embodiment of the invention.
Figure 3:
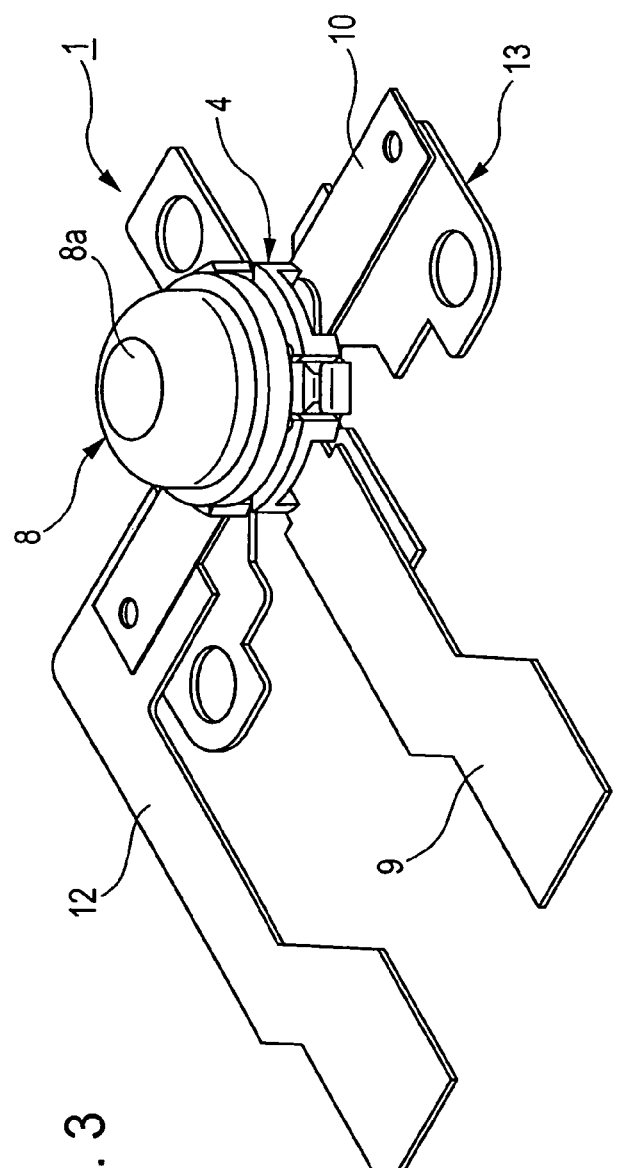
FIG. 3 is a perspective view of the coordinate input device according to the first embodiment of the invention.
Figure 4:
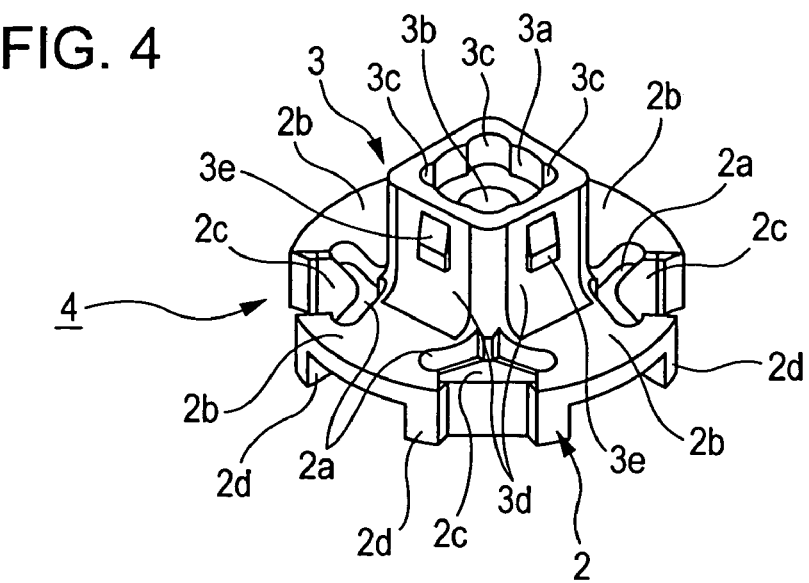
FIG. 4 is a perspective view of an input member according to the first embodiment of the invention.
Figure 5:
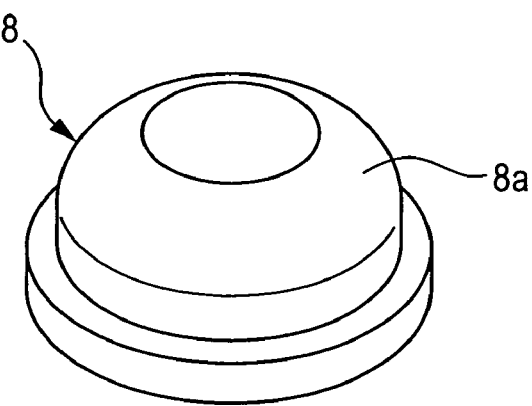
FIG. 5 is a perspective view of a rubber cap according to the first embodiment of the invention.
Figure 6:
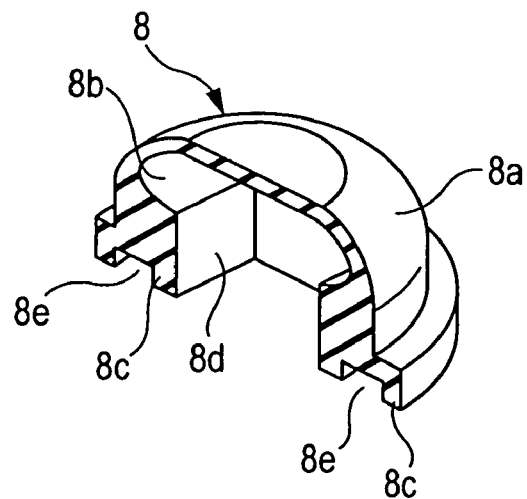
FIG. 6 is a perspective cross-sectional view of the rubber cap of FIG. 5.
Figure 7:
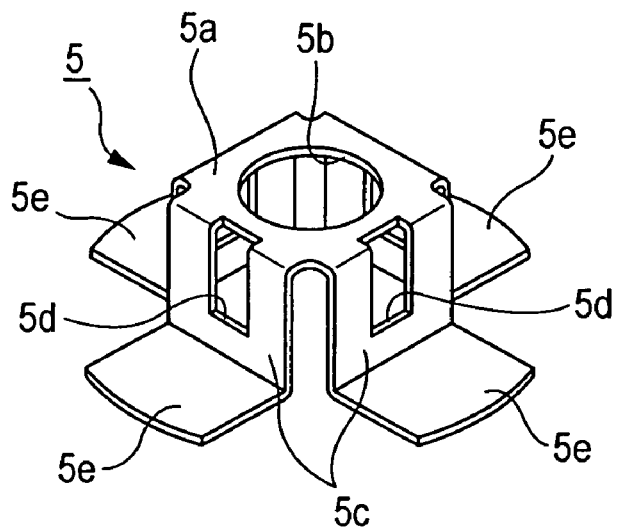
FIG. 7 is a perspective view of a cap support member according to the first embodiment of the invention.
Figure 8:
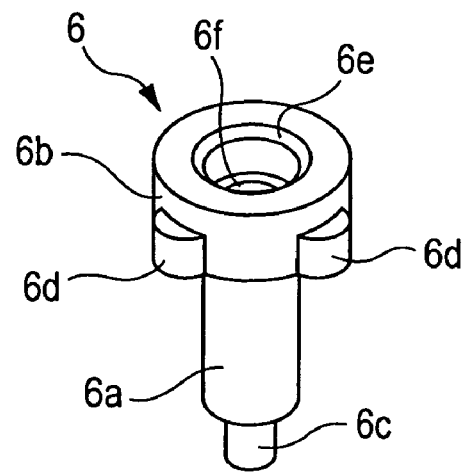
FIG. 8 is a perspective view of a driving pin according to the first embodiment of the invention.
Figure 9:
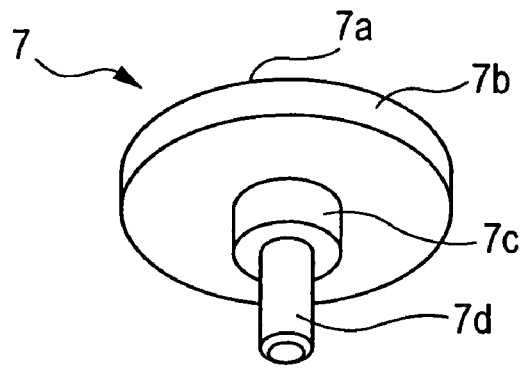
FIG. 9 is a perspective view of a controller according to the first embodiment of the invention.
Figure 10:
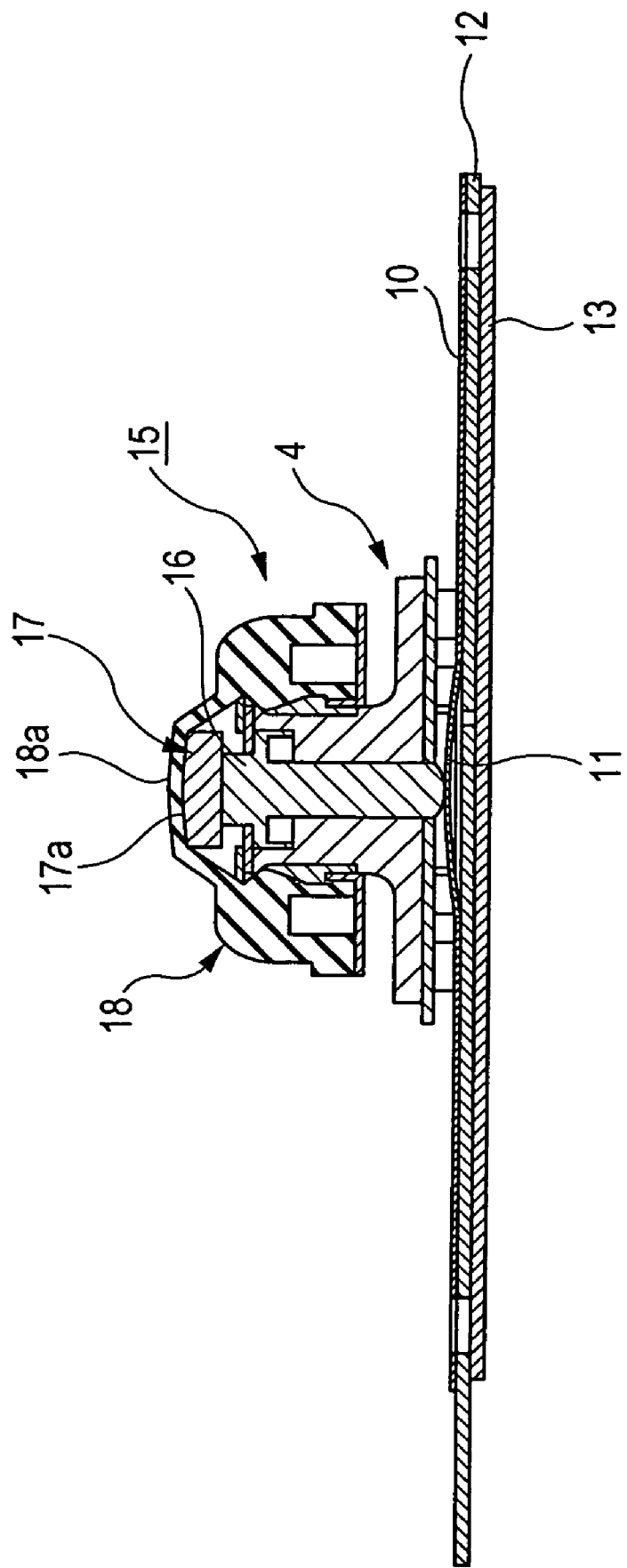
FIG. 10 is a cross-sectional view of the essential part of a coordinate input device according to a modification of the invention.

The coordinate input device of the present invention is mounted to the keyboard of a portable notebook computer and so forth and is capable of controlling the shifting of the cursor etc. to a desired position on a display. A coordinate input device according to a first embodiment of the invention will be described with reference to FIGS. 1 to 10. FIG. 1 is an exploded perspective view of the coordinate input device according to the first embodiment of the present invention; FIG. 2 is a cross-sectional view of the essential part of the coordinate input device; FIG. 3 is a perspective view of the coordinate input device; FIG. 4 is a perspective view of an input member according to the first embodiment; FIG. 5 is a perspective view of a rubber cap according to the first embodiment; FIG. 6 is a perspective cross-sectional view of the rubber cap of FIG. 5; FIG. 7 is a perspective view of a cap support member according to the first embodiment; FIG. 8 is a perspective view of a driving pin according to the first embodiment; FIG. 9 is a perspective view of a controller according to the first embodiment; and FIG. 10 is a cross-sectional view of the essential part of a coordinate input device according to a modification of the invention.

As shown in FIGS. 1 to 3, the coordinate input device 1 of the invention has an input member 4 including a base 2 approximately circular in outer shape and an approximately square-pole stick 3 of a specified height that stands upright from the center of the upper surface (one surface) of the base 2.

The input member 4, which is formed of the base 2 and the stick 3, is made of a heat-resistant ceramic member such as alumina and has a good temperature characteristic that causes little expansion or contraction even by a great change in ambient temperature.

As shown in FIG. 4, the base 2 of the input member 4 is substantially circular in shape and divided at regular intervals of 90° around the circumference to form four notches 2a, and has four ribs 2b between the notches 2a.

Between the adjacent ribs 2b, crosspieces 2c that connect the adjacent ribs 2b are provided.

Pedestals 2d of a specified size project downward from the crosspieces 2c.

A heat-resistant cermet resistor is printed on the lower surface (the other surface of the base 2) of each rib 2b, to which a deformation sensor (not shown) is provided in which the variation in the resistance of the resistor is adjusted by laser trimming and so forth.

A first support hole 3a of a specified diameter and depth is provided at the upper end face of the square-pole stick 3. A second support hole 3b of a smaller diameter than that of the first support hole 3a passes through the center of the bottom of the first support hole 3a.

Substantially semicircular slide grooves 3c of a depth equal to that of the first support hole 3a are provided at four portions at which the visible line of the first support hole 3a and the diagonals of the square-pole stick 3 intersect. Projections 3e of a specified height are provided on four outer walls 3d of the square-pole stick 3.

The stick 3 is covered with a cap support member 5 formed by punching a stainless plate or the like. As shown in FIG. 7, the cap support member 5 has a top plate 5a opposed to the upper end face of the stick 3, and has a through hole 5b in the center of the top plate 5a, for a driving pin 6, to be described later, to slidably pass through.

Four side plates 5c are connected to the four sides of the top plate 5a and are bent downward. The four side plates 5c can hold the outer walls 3d of the stick 3.

The side plates 5c each have a longitudinal locking hole 5d and are bent outward at a right angle at the lower ends to form support plates 5e. The lower end 8c of a rubber cap 8, to be described later, which is press-fitted in the stick 3, is in contact with the support plates 5e.

The cap support member 5 mounted to the stick 3 is prevented from coming off from the stick 3 in such a way that the opposing side plates 5c hold the outer walls 3d of the square-pole stick 3 and the projections 3e are fitted in the locking holes 5d.

The second support hole 3b of the stick 3 allows the driving pin 6 made of resin or the like to pass through. As shown in FIG. 8, the driving pin 6 includes a small-diameter control shaft 6a to be passed through the second support hole 3b and a columnar part 6b with a larger diameter than that of the control shaft 6a, to be fitted in the first support hole 3a. The control shaft 6a has a sensor controller 6c projecting from the lower end thereof.

The columnar part 6b has multiple projections 6d that project partially from the outer circumference thereof. The projections 6d are slidably fitted in the slide grooves 3c of the stick 3.

The columnar part 6b has a first press-fit hole 6e with a specified diameter and depth in the center thereof, and a second press-fit hole 6f with a smaller diameter than that of the first press-fit hole 6e and a specified depth in the bottom of the first press-fit hole 6e.

A controller 7 made of metal or the like is integrated with the driving pin 6 and has a circular plate 7b having a large-area control surface 7a on the top, and a large-diameter first connecting portion 7c and a second connecting portion 7d projecting from the lower surface of the circular plate 7b, as shown in FIG. 9.

The circular plate 7b is substantially equal in diameter to an engage hole 8d of the rubber cap 8, to be allowed to pass through the engage hole 8d. The driving pin 6 and the controller 7 are joined in such a way that the control shaft 6a of the driving pin 6 is first passed though the second support hole 3b of the stick 3, then the columnar part 6b is brought into contact with the first support hole 3a, and the projections 6d are slidably fitted into the slide grooves 3c.

Then, when the cap support member 5 is mounted on the upper end of the stick 3, the columnar part 6b of the driving pin 6 projects upward from the through hole 5b and the projections 6d are locked in the locking holes 5d, so that the driving pin 6 can be slid vertically by a specified length.

When the first and second connecting portion 7c and 7d of the controller 7 are press-fitted into the first and second press-fit holes 6e and 6f of the driving pin 6, the driving pin 6 and the controller 7 are integrated to one, and as such, they can be slid together vertically.

The substantially cap-shaped rubber cap 8, shown in FIGS. 5 and 6, can be press-fitted in the stick 3 of the input member 4.

The rubber cap 8 is made of nitrile-butadien rubber (NBR) or the like, a kind of synthetic rubber, at the end of which a substantially arc-shaped control section 8a is provided. The control section 8a has multiple fine nonslip members (not shown) formed by, e.g., hair plantation to prevent the fingers of the operator from slipping.

A dome-shaped cavity 8b is provided in the control section 8a of the rubber cap 8. When the control section 8a is pushed, the rubber cap 8 is deformed elastically in the direction in which it becomes flat along the height of the cavity 8b to move the control section 8a downward.

A rectangular engage hole 8d is provided in the center of the lower end 8c of the rubber cap 8. The engage hole 8d connects to the cavity 8b.

The engage hole 8d can be press-fitted on the stick 3 of the input member 4 via the cap support member 5.

The rubber cap 8 has a groove 8e with a specified width and depth around the engage hole 8d, at the lower end 8c. The groove 8e allows the rubber cap 8 to be deformed elastically not only on the side adjacent to the cavity 8b but also at the lower end 8c.

This increases the stroke of pushing of the operator to improve the feeling of operation.

As shown in FIG. 2, when the engage hole 8d of the rubber cap 8 is press-fitted on the stick 3 to which the cap support member 5 is mounted and through which the driving pin 6 integrated with the controller 7 is passed through, and is moved downward, the lower end 8c comes into contact with the support plates 5e of the cap support member 5 to stop the downward movement of the lower end 8c, and the control surface 7a of the controller 7 comes into contact with the ceiling of the cavity 8b.

When the rubber cap 8 is press-fitted in the stick 3, the projections 3e projecting from the locking holes 5d of the cap support member 5 dig into the inner wall of the engage hole 8d to be firmly fitted on the stick 3 via the cap support member 5.

A first sensor board 9 formed of a flexible printed circuit (FPC) is bonded to the lower surface of the base 2 of the input member 4, except the pedestal 2d, with an adhesive or the like. The first sensor board 9 has deformation sensors 9a at four positions facing the ribs 2b of the base 2 of the input member 4. In the center of the four deformation sensors 9a, a hole 9b is provided for the sensor controller 6c of the driving pin 6 to pass through.

When a tilting load from an oblique upper angle or from the side is applied to the control section 8a of the rubber cap 8 fitted on the stick 3 to tilt the stick 3, the ribs 2b is deformed slightly. The deformation of the ribs 2b is detected by the deformation sensors 9a.

The first sensor board 9 has a film-like plate support member 10 thereunder, in the center of which a plate support portion 10a is provided.

The plate support portion 10a supports an arc-section metal contact 11 that is formed by projecting an elastic stainless steel plate or the like in the form of a dome. The sensor controller 6c of the driving pin 6 comes into contact with the top of the metal contact 11 to elastically bias the driving pin 6 upward.

When the driving pin 6 is pushed downward, the metal contact 11 is pushed by the sensor controller 6c to be reversed, thereby generating the feeling of clicking.

The plate support member 10 which supports the metal contact 11 is placed on a second sensor board 12. The second sensor board 12 is made of a membrane sheet having multiple films, and has a membrane switch (not shown) serving as pressure sensor at the position of the second sensor board 12 facing the metal contact 11.

The switching circuit of the membrane switch is switched when the second sensor board 12 is pushed by the reversed metal contact 11.

The coordinate input device 1 according to the first embodiment is assembled in such a way that the second sensor board 12, the plate support member 10 to which the metal contact 11 is mounted, the first sensor board 9, and the input member 4 are stacked on a metal plate 13, and are integrated to one piece by staking stakes 13a to the crosspieces 2c of the base 2 of the input member 4.

The operation of the coordinate input device 1 with such a structure will be described with reference to FIG. 1. The operation of the pressure sensor is as follows: When the control section 8a of the rubber cap 8 is pushed substantially vertically, then the cavity 8b is deformed elastically to push the control surface 7a of the controller 7 with its ceiling and as such, the driving pin 6 slides downward. At that time, the portion of the groove 8e at the lower end 8c of the rubber cap 8 is also deformed elastically. Accordingly, the operation stroke of the control section 8a can be longer than that of the driving pin 6 even with a short stick, providing good operation feeling irrespective of the thickness and size of the stick.

When the sensor controller 6c of the driving pin 6 is moved downward, the top of the metal contact 11 is pushed to be reversed, thereby generating the feeling of clicking, and the membrane switch (not shown) of the lower second sensor board 12 is activated to make an input in Z-direction.

When the pressure applied to the rubber cap 8 is released, the metal contact 11 is automatically restored to the initial arc shape in section to switch the switching circuit of the membrane switch, and push the driving pin 6 upward.

At the same time, the cavity 8b, which has been deformed elastically, is also automatically restored to the initial dome shape to move the controller 7 integrated with the driving pin 6 upward into the initial position.

The operation of the deformation sensors 9a is as follows: When the control section 8a of the rubber cap 8 is given a tilting load from an oblique upper position or from the side, the stick 3 is tilted. The tilting deformation of the stick 3 is detected by the deformation sensors 9a to allow an input in X-Y direction.

While the pressure sensor is described in this embodiment with the membrane switch as an example, it may be any sensors that can detect the pressure of a piezoelectric element etc.

A coordinate input device 15 according to a modification of the invention will be described with reference to FIG. 10. A control section 18a of a rubber cap 18 may be shaped such that the part of the control section 18a facing a control surface 17a of a controller 17 integrated with a driving pin 16 projects by a specified height.

The modified coordinate input device 15 has the controller 17 at a position facing the projecting control section 18a, so that the position of the driving pin 16 can be recognized, allowing reliable pushing operation.

Figure 11:
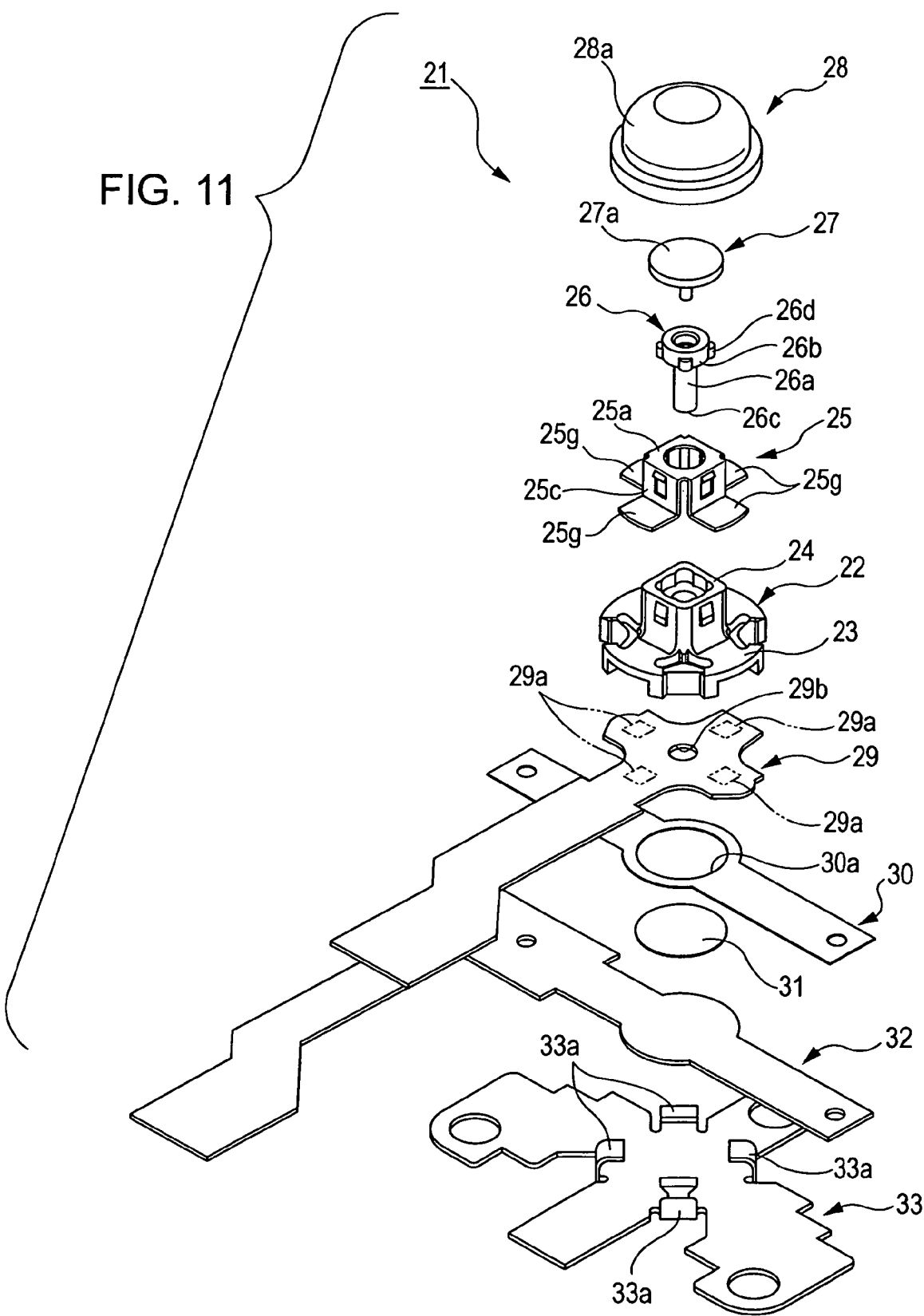
FIG. 11 is an exploded perspective view of a coordinate input device according to a second embodiment of the invention.
Figure 12:
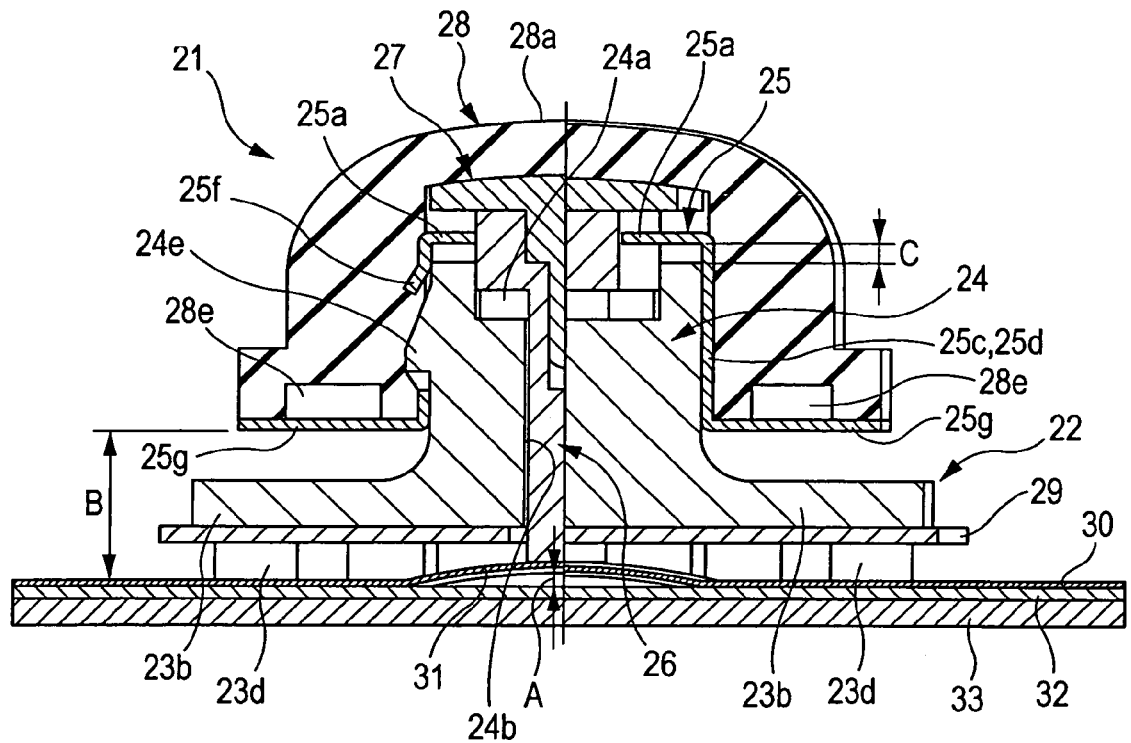
FIG. 12 is a cross-sectional view of the essential part of the coordinate input device according to the second embodiment of the invention.
Figure 13:
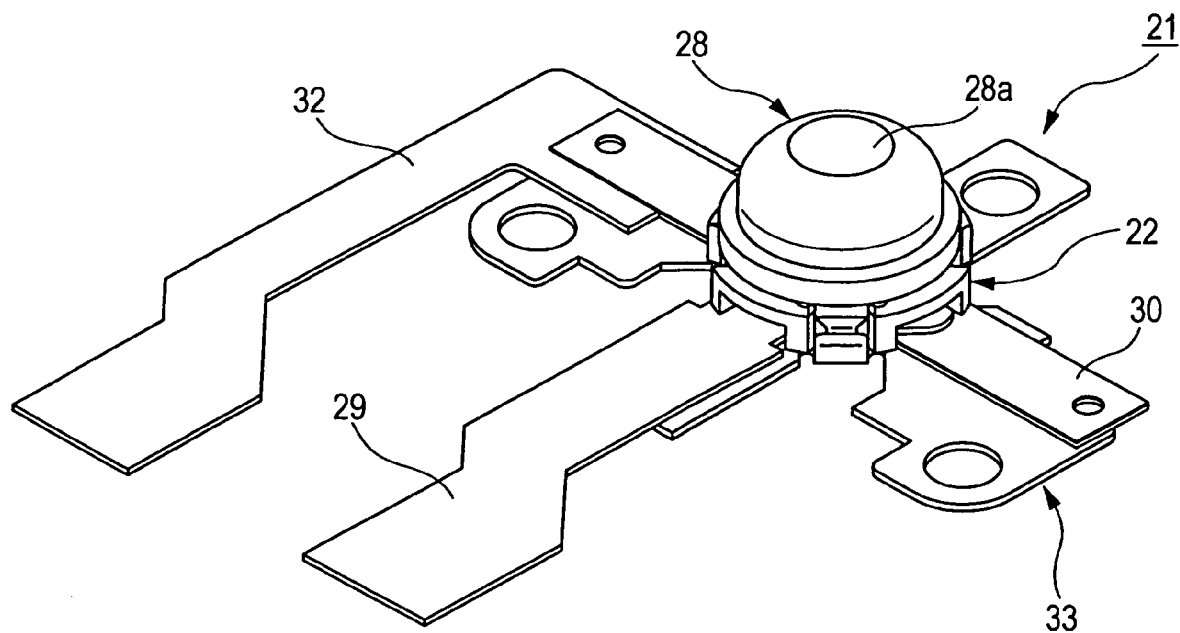
FIG. 13 is a perspective view of the coordinate input device according to the second embodiment of the invention.
Figure 14:
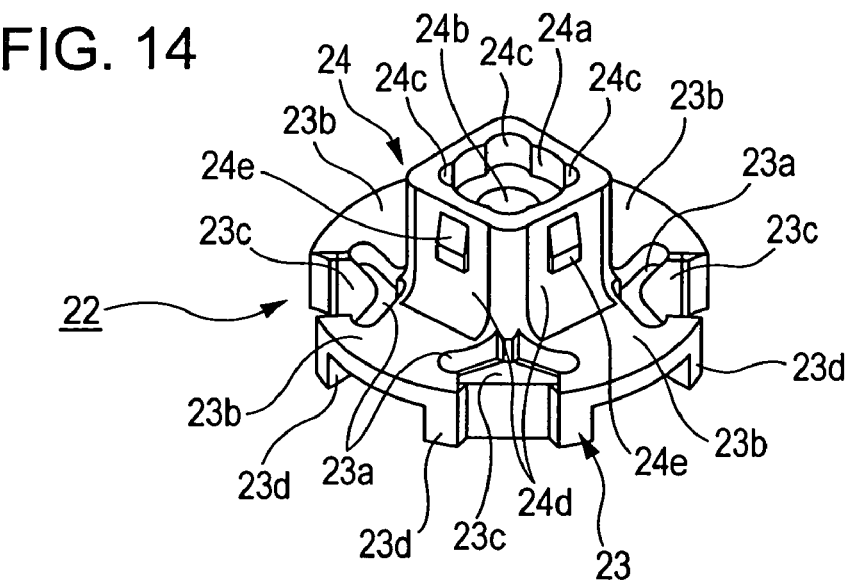
FIG. 14 is a perspective view of an input member according to the second embodiment of the invention.
Figure 15:
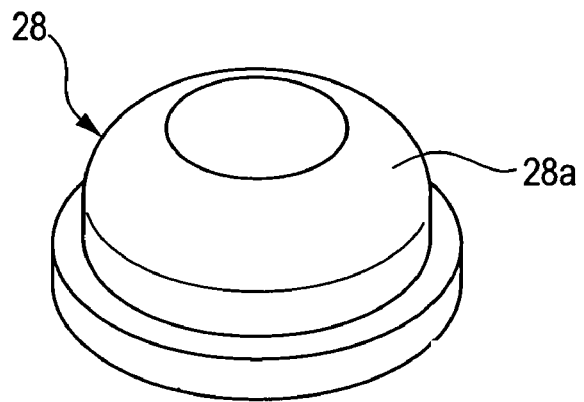
FIG. 15 is a perspective view of a rubber cap according to the second embodiment of the invention.
Figure 16:
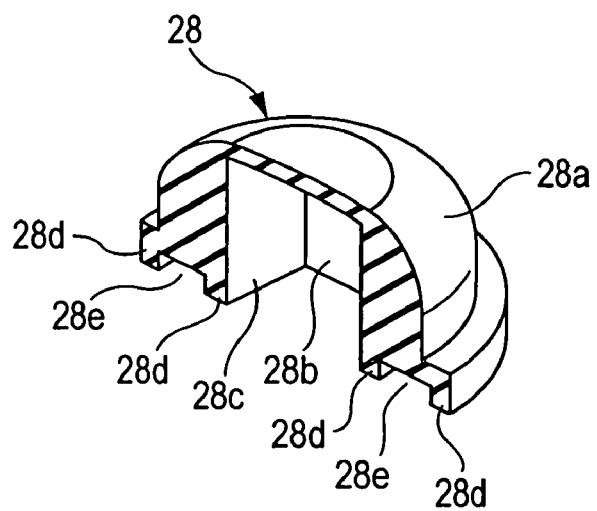
FIG. 16 is a perspective cross-sectional view of the rubber cap of FIG. 15.
Figure 17:
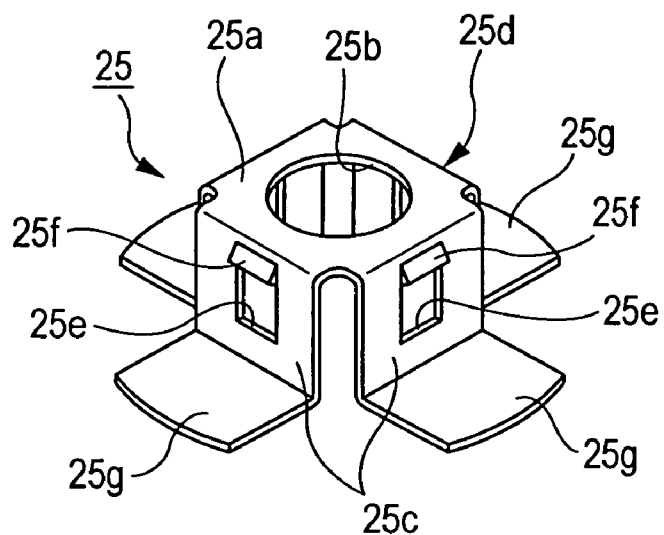
FIG. 17 is a perspective view of a cap support member according to the second embodiment of the invention.
Figure 18:
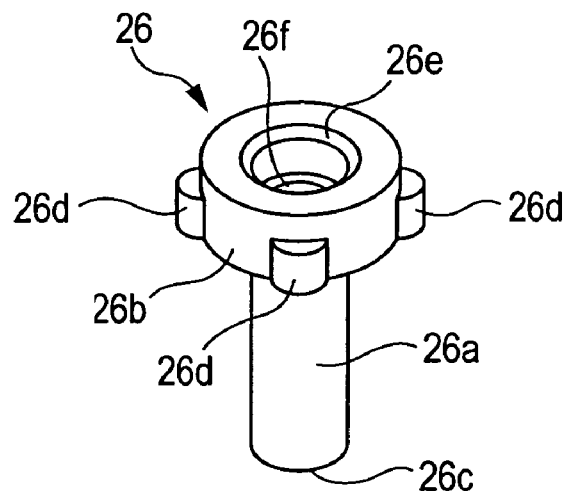
FIG. 18 is a perspective view of a driving pin according to the second embodiment of the invention.
Figure 19:
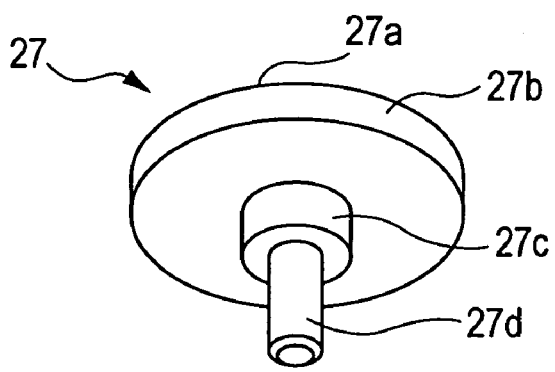
FIG. 19 is a perspective view of a controller according to the second embodiment of the invention.
Figure 20:
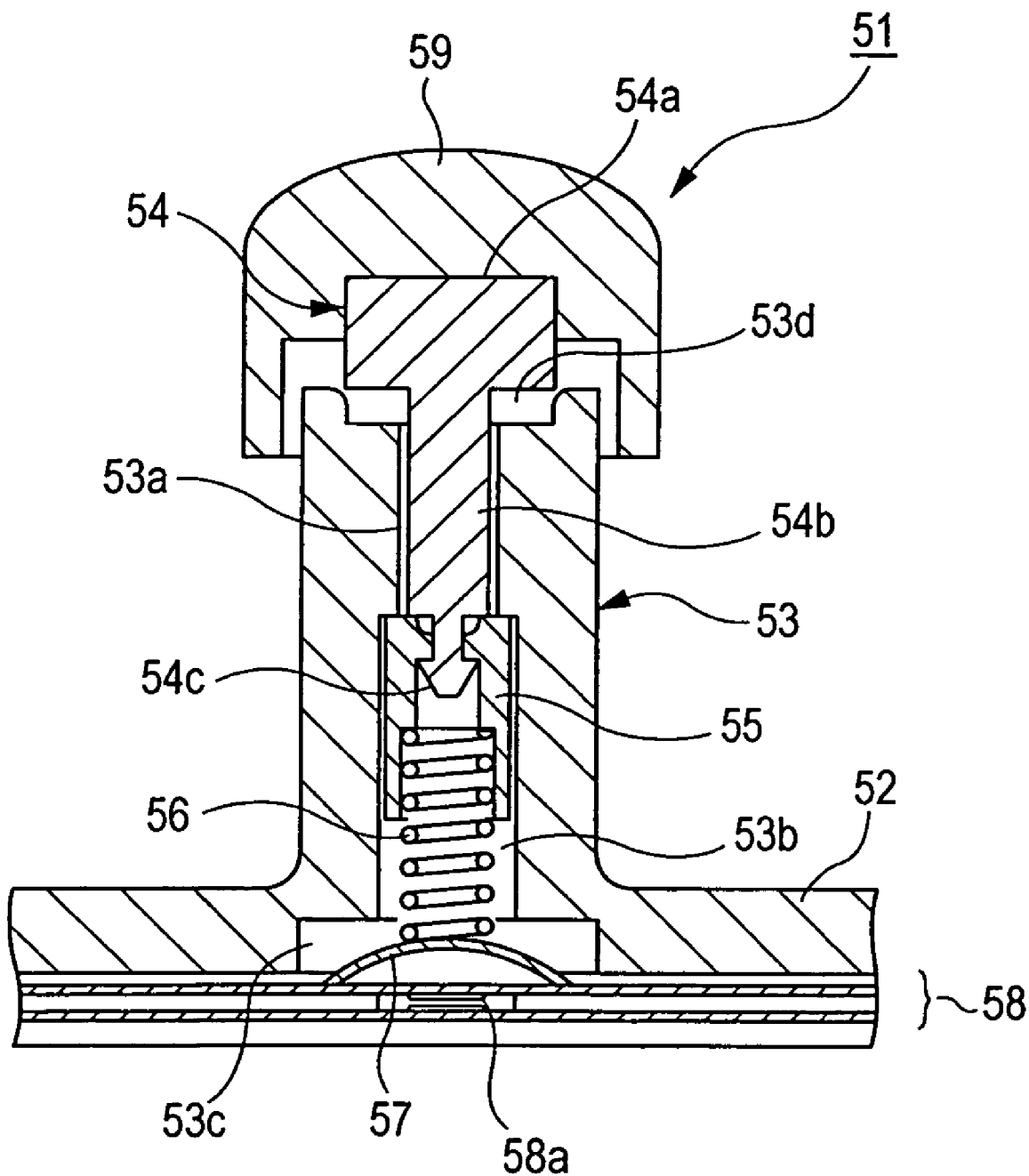
FIG. 20 is a cross-sectional view of the essential part of a related-art coordinate input device.

A coordinate input device according to a second embodiment of the invention will be described with reference to FIGS. 11 to 19. FIG. 11 is an exploded perspective view of the coordinate input device according to the second embodiment of the invention; FIG. 12 is a cross-sectional view of the essential part of the coordinate input device according to the second embodiment; FIG. 13 is a perspective view of the coordinate input device according to the second embodiment; FIG. 14 is a perspective view of an input member according to the second embodiment; FIG. 15 is a perspective view of a rubber cap according to the second embodiment; FIG. 16 is a perspective cross-sectional view of the rubber cap of FIG. 15; FIG. 17 is a perspective view of a cap support member according to the second embodiment; FIG. 18 is a perspective view of a driving pin according to the second embodiment; and FIG. 19 is a perspective view of a controller according to the second embodiment.

As shown in FIGS. 11 to 14, an input member 22 of the coordinate input device 21 of the invention includes a base 23 whose outer shape is approximately circular, and an approximately square-pole stick 24 of a specified height that stands upright from the center of the upper surface (one surface) of the base 23.

The input member 22, which is formed of the base 23 and the stick 24, is made of a resin or heat-resistant ceramic member such as alumina and has a good temperature characteristic that causes little expansion or contraction even with a great change in ambient temperature.

The base 23 of the input member 22 is substantially circular in shape and divided at regular intervals of 90° around the circumference to form four notches 23a, and has four ribs 23b between the notches 23a.

Between the adjacent ribs 23b, crosspieces 23c that connect the adjacent ribs 23b are provided.

Pedestal 23d of a specified size project downward from the crosspieces 23c.

A heat-resistant cermet resistor is printed on the lower surface (the other surface of the base 23) of each rib 23b, to which a deformation sensor (not shown) is provided in which the variation in the resistance of the resistor is adjusted by laser trimming and so forth.

A first support hole 24a of a specified diameter and depth is provided at the upper end face of the square-pole stick 24. A second support hole 24b of a smaller diameter than that of the first support hole 24a passes through the center of the bottom of the first support hole 24a.

Substantially semicircular guide grooves 24c of a depth equal to that of the first support hole 24a are provided at four portions at which the visible line of the first support hole 24a and the diagonals of the square pole of the stick 24 intersect. Projection 24e of a specified height and a small width are provided on multiple outer walls 24d of the square-pole stick 24.

The stick 24 holds a cap support member 25 that supports a rubber cap 28, to be described later, so as to slide it vertically in the drawing.

As shown in FIG. 17, the cap support member 25 is formed by punch-pressing and bending a stainless plate or the like to form a top plate 25a opposed to the upper end face of the stick 24, and has a through hole 25b in the center of the top plate 25a, for a driving pin 26, to be described later, to pass through.

Four side plates 25c are provided on the four sides of the top plate 25a and bent in the same direction to form a square-pole stick holding portion 25d.

As shown in FIG. 12, the cap support member 25 in which the stick holding portion 25d holds the stick 24 can be slid vertically in the drawing. Specifically, when the stick holding portion 25d is fitted on the stick 24, the cap support member 25 can slid along the stick 24 while the four side plates 25c of the stick holding portion 25d hold the four outer walls 24d of the stick 24.

The four side plates 25c of the stick holding portion 25d each have a longitudinal rectangular locking hole 25d. When the cap support member 25 holds the stick 24 with the four side plates 25c, the projections 24e on the outer walls 24d of the stick 24 are fitted in locking holes 25e, so that the cap support member 25 is prevented from coming off from the stick 24.

The upper ends of the locking holes 25e each have an outward and downward leaning projection 25f, with which the rubber cap 28 press-fitted on the stick holding portion 25d is locked.

The lower ends of the four side plates 25c are bent outward at a right angle to form cap support portions 25g.

The lower end 28c of the rubber cap 28, which is press-fitted on the stick holding portion 25d, can be brought into contact with the cap support portions 25g.

The cap support member 25 which is in engagement with the stick 24 is prevented from coming off upward from the stick 24, in the drawing, such that the projections 24e come into engagement with the locking holes 25e.

The second support hole 24b of the stick 24 allows the driving pin 26 made of resin or the like to pass through. As shown in FIG. 18, the driving pin 26 includes a small-diameter control shaft 26a that slidably passes through the second support hole 24b, and a pressure controller 26b with a larger diameter than that of the control shaft 26a, which is fitted in the first support hole 24a and can be partly passed through the through hole 25b of the cap support member 25.

The lower end 26c of the control shaft 26a can reverse a metal contact 31, to be described later.

Multiple (four) substantially semicircular projections 26d project from the outer circumference of the pressure controller 26b at intervals of 90°. When the projections 26d are slidably fitted in the guide grooves 24c of the stick 24, the rotation of the driving pin 26 is prevented. When the pressure controller 26b of the driving pin 26 is partly passed through the through hole 25b of the cap support member 25, the driving pin 26 is prevented from coming off upward from the through hole 25b by the projections 26d.

The pressure controller 26b has a first press-fit hole 26e with a specified diameter and depth in the center thereof, and a second press-fit hole 26f with a smaller diameter than that of the first press-fit hole 26e and a specified depth in the bottom of the first press-fit hole 26e.

A controller 27 is press-fitted into the first and second press-fit holes 26e and 26f of the driving pin 26 to integrate them, and has a control surface 27a larger than the outer diameter of the pressure controller 26b.

In short, the driving pin 26 is provided with the control surface 27a larger than the outer diameter of the pressure controller 26b by press-fitting the controller 27 into the driving pin 26 to integrate to one piece.

The controller 27 is made of metal or the like, and has a circular plate 27b having a large-area control surface 27a on the top, and a large-diameter first press-fit portion 27c that can be press-fitted into the first press-fit hole 26e of the driving pin 26 and a small-diameter second press-fit portion 27d that can be press-fitted into the second press-fit hole 26f, which project by a specified height from the lower surface of the circular plate 27b.

The diameter of the circular plate 27b is slightly smaller than that of a press-fit hole 28b of the rubber cap 28, allowing the circular plate 27b to be fitted into the press-fit hole 28b.

The driving pin 26 and the cap support member 25 are mounted to the stick 24 in such a way that the first press-fit portion 27c of the controller 27 is first passed through the through hole 25b of the cap support member 25.

Then the first and second press-fit portions 27c and 27d of the controller 27 are press-fitted into the first and second press-fit holes 26e and 26f of the driving pin 26 and, as such, the driving pin 26 and the controller 27 are integrated, and the top plate 25a of the cap support member 25 is sandwiched between the projections 26d of the driving pin 26 and the circular plate 27b of the controller 27, thereby locking them.

When the control shaft 26a of the driving pin 26 is put into the second support hole 24b of the stick 24, the pressure controller 26b is fitted in the first support hole 24a and the projections 26d are fitted in the guide grooves 24c.

At the same time, the stick holding portion 25d formed of the four side plates 25c of the cap support member 25 is fitted on the four outer walls 24d of the stick 24, allowing the cap support member 25 and the driving pin 26 to slide along the stick 24.

The substantially cap-shaped rubber cap 28, shown in FIGS. 15 and 16 can be press fitted on the stick holding portion 25d of the cap support member 25 which is slidably fitted on the stick 24 of the input member 22.

The rubber cap 28 is made of NBR or the like, a kind of synthetic rubber, at the end of which a substantially arc-shaped control section 28a is provided. The control section 28a has multiple fine nonslip member (not shown) formed by e.g., hair plantation to prevent the fingers of the operator from sipping.

The square press-fit hole 28b with a specified depth, which can be press-fitted on the stick holding portion 25d of the cap support member 25, is provided in the control section 28a of the rubber cap 28.

The press-fit hole 28b has four inner surfaces 28c, into which the projections 25f of the four side plates 25c dig, preventing it from coming off from the cap support member 25.

The rubber cap 28 has a groove 28e with a specified width and depth around the engage hole 28d, at the lower end 28d. The groove 28e allows the rubber cap 28 to be deformed elastically at the lower end 28d.

The rubber cap 28 is press fitted in such a way that the press-fit hole 28b is pushed on the stick holding portion 25d of the cap support member 25 which is in engagement with the stick 24.

Then, as shown in FIG. 12, the lower end 28d comes into contact with the cap support portions 25g of the cap support member 25, and the control surface 27a of the controller 27 comes into contact with the ceiling of the press-fit hole 28b.

When the rubber cap 28 is press-fitted on the stick holding portion 25d of the cap support member 25, the projections 24e project slightly from the locking holes 25e of the cap support member 25. However, the rubber cap 28 can be slid when the cap support member 25 slides on the stick 24.

A first sensor board 29 formed of an FPC is bonded to the lower surface of the base 23 of the input member 22, except the pedestal 23d, with an adhesive or the like. The first sensor board 29 has deformation sensors 29a at four positions facing the ribs 23b of the base 23 of the input member 22. In the center of the four deformation sensors 29a, a hole 29b is provided for the control shaft 26a of the driving pin 26 to pass through.

When the control section 28a of the rubber cap 28 fitted on the stick holding portion 25d constructed of four side plates 25c of the cap support member 25 is given a tilting load from an oblique upper angle or from the side to tilt the stick 24, the ribs 23b is deformed slightly. The deformation of the ribs 23b can be detected by the deformation sensors 29a.

A film-like metal support member 30 is disposed under the first sensor board 29, in the center of which a metal support portion 30a is provided.

The metal support portion 30a supports an arc-section metal contact 31 that is formed by stamping an elastic stainless steel plate or the like substantially in the form of a dome.

The lower end 26c of the control shaft 26a of the driving pin 26 comes into contact with the top of the dome metal contact 31 to elastically bias the driving pin 26 supported by the stick 24 upward.

The metal contact 31 works in such a way that when the lower end 26c of the control shaft 26a of the driving pin 26 pushes the top of the dome, the dome is reversed to generate the feeling of clicking.

The metal support member 30 which supports the metal contact 31 is placed on a second sensor board 32. The metal contact 31 placed on the second sensor board 32 has a height A to the ceiling of the dome.

The second sensor board 32 is made of a membrane sheet having multiple films, and has a membrane switch (not shown) serving as pressure sensor at the position of the second sensor board 32 facing the metal contact 31.

The switching circuit of the membrane switch is switched when pushed by the reversed metal contact 31.

The coordinate input unit 21 according to the second embodiment is assemble in such a way that second sensor board 32, the metal support member 30 to which the metal contact 31 is mounted, the first sensor board 29, and the input member 22 to which the cap support member 25, the driving pin 26, and the rubber cap 28 are mounted, are stacked on a metal plate 33, and are integrated to one piece by staking stakes 33a to the crosspieces 23c of the base 23 of the input member 22.

Referring to FIG. 12, in the coordinate input device 21 with such a structure, the driving pin 26 placed on the top of the dome-shaped metal contact 31 via the metal support member 30 is biased upward by the pushing force of the metal contact 31 into a specified upper position.

When the driving pin 26 is in the upper position, the rubber cap 28 is pushed upward, so that the cap support member 25 that press-supports the rubber cap 28 is located in an upper position of a height B from the lower surface of the cap support portions 25g to the second sensor board 32 on which the metal contact 31 is placed.

The cap support member 25 in the upper position of the height B has a gap of a height C larger than the height A of the dome-shaped metal contact 31 between the top of the stick 24 and the inner surface of the top plate 25a.

Briefly, the relationship between the metal contact 31 and the cap support member 25 is A<C. This ensures the driving pin 26 to push the metal contact 31 to reverse it, thus allowing the switching circuit of the membrane switch of the second sensor board 32, serving as presser sensor, to be switched reliably.

The operation of the coordinate input device 21 with such a structure will be described with reference to FIG. 12. The control section 28a of the rubber cap 28 is first pushed substantially vertically in the initial state in which the cap support member 25 and the driving pin 26 are in the upper position.

Then, the controller 27 is pushed by the rubber cap 28 to slide the driving pin 26 downward, decreasing the gap height C by a specified value. Thus, the cap support portions 25g is pushed by the lower end 28d of the rubber cap 28 and as such, the cap support member 25 is also slid downward along the stick 24, decreasing the height B by a specified value.

The metal contact 31 is reversed by the lower end 26c of the driving pin 26 and so the membrane switch (not shown) of the lower second sensor board 32 is turned on and as such, the switching circuit is switched to do input in the z-direction.

When the rubber cap 28 moves downward together with the downward sliding of the cap support member 25, the projections 24e of the stick 24 dig slightly in the inner surface 28c, as shown in FIG. 12. This, however, does not obstruct the downward and upward movement of the rubber cap 28 because of the small width of the projections 24e and the elastic deformation of the rubber cap 28.

The reversing of the metal contact 31 causes the feeling of clicking. The operator senses the feeling of clicking, recognizing that the membrane switch is turned on to switch the switching circuit.

When the pressure applied to the rubber cap 28 is released after the z-direction input is made, the metal contact 31 is automatically restored into the initial dome shape by its own elasticity to turn off the membrane switch, thereby moving the driving pin 26 upward.

Thus, the rubber cap 28 and the cap support member 25 are automatically moved upward into the initial state.

The operation of the deformation sensors 29a is as follows: When the control section 28a of the rubber cap 28 is given a tilting load from an oblique upper position or from the side, the stick 24 is tilted. The tilting deformation of the stick 24 is detected by the deformation sensors 29a to allow an input in X-Y direction.

The coordinate input device 21 according to the second embodiment provides reliable recognition of the clicking since the driving pin 26 directly pushes the metal contact 31, providing good operation feeling.

The coordinate input device 1 according to the first embodiment can be decreased in height, and so can be decreased in width because it has no compression spring as in the relate art.

While the pressure sensor of the embodiments of the invention is a membrane switch, it may be any sensors that can detect the pressure of piezoelectric elements etc.

What is claimed is:

1. A coordinate input device comprising:
   a base having a deformation sensor;
   a stick that stands upright with a specified height from the base;
   a rubber cap that can be press-fitted on the stick;
   a pressure sensor that can be controlled by pushing a control section formed at an upper end of the rubber cap;
   a dome-shaped metal contact disposed on the pressure sensor; and
   a driving pin supported by the stick, the driving pin capable of pushing the pressure sensor; and
   a first sensor board and a second sensor board, wherein
      when the control section of the rubber cap is pushed, the driving pin is pushed by the elastic deformation of the cavity to reverse the metal contact,
      the base includes a plurality of notches forming a plurality of ribs operable to be deformed, the deformation of the ribs being detected by the deformation sensor,
      the first sensor board is fixed to a lower surface of the base,
      a hole through which the driving pin is inserted is formed through the first sensor board,
      the deformation sensor is formed on the first sensor board,
      the second sensor board is disposed under a lower surface of the first sensor board,
      the metal contact and the pressure sensor are provided on the second sensor board opposite the hole,
      in an initial state, a front end of the driving pin is in contact with the metal contact through the hole, and the driving pin and the rubber cap are urged upward,
      when the control section of the rubber cap is pushed, the driving pin slides inside the stick and in the hole of the first sensor board to reverse the metal contact for operating the pressure sensor, and
      when the pushing is released, the driving pin and the rubber cap slide upward to return to the initial state due to automatic resilience of the metal contact.

2. The coordinate input device according to claim 1, wherein the stick has a support hole for the driving pin to pass through, wherein when the rubber cap is pushed, the driving pin is slid in the support hole.

3. The coordinate input device according to claim 1, wherein the stick holds a cap support member that supports the rubber cap and wherein when the control section is pushed, the rubber cap moves downward together with the cap support member;
   the stick is shaped in the form of a square pole, and the cap support member has side plates that can hold an outer wall of the square-pole stick; and
   the outer wall of the stick has projections that can be fitted in locking holes formed in the side plates of the cap support member.

4. The coordinate input device according to claim 3, wherein:
   the rubber cap has an engage hole that can be press-fitted on the stick; and
   the projections project by a specified length from the locking holes of the cap support member mounted to the stick.

5. The coordinate input device according to claim 1, wherein:
   the driving pin has a columnar part, part of an outer circumference of the columnar part being projected to form projections, and
   the cap support member has a through hole for the columnar part of the driving pin to pass through, wherein
   the driving pin whose columnar part is passed through the through hole is prevented from coming off by the projections.

6. The coordinate input device according to claim 5, wherein
   the driving pin has a control surface that is in contact with a ceiling of a cavity of the rubber cap, a size of the control surface being larger than an outside diameter of the columnar part.

7. The coordinate input device according to claim 6, wherein the control surface is a controller separate from the driving pin, wherein
   a connecting portion of the controller is press-fitted in a press-fit hole of the driving pin to integrate the driving pin with the controller.

8. The coordinate input device according to claim 5, wherein
   the stick has slide grooves on diagonals of the square pole, for the projections of the driving pin to be slidably fit in.

9. The coordinate input device according to claim 2, wherein the driving pin is made of resin.

10. The coordinate input device according to claim 1, wherein the rubber cap has a groove with a specified width and depth at a lower end.

11. The coordinate input device according to claim 7, wherein the control section of the rubber cap has a specified-height projection at the part facing the control surface of the controller integrated with the driving pin.

12. A coordinate input device comprising:
    an input member having a plurality of deformation sensors;
    a rubber cap that can be press-fitted on a stick projecting with a specified height from a base of the input member;
    a switch member that can be controlled by pushing a control section of the rubber cap;
    a dome-shaped metal contact disposed on the switch member; and
    a driving pin supported by the stick, the driving pin capable of pushing the switch member; and
    a first sensor board and a second sensor board,
       wherein, when the rubber cap is slid by the pressure, the driving pin is also slid to reverse the metal contact, the base includes a plurality of notches forming a plurality of ribs operable to be deformed, the deformation of the ribs being detected by the deformation sensors, the rubber cap is slidably supported by the stick and when the control section of the rubber cap is pushed, the rubber cap is slid along the stick to make the switch member operative, the stick holds a cap support member that supports the rubber cap, the cap support member has side plates that can hold an outer wall of the stick, the outer wall of the stick has projections that can be fitted in locking holes formed in the side plates of the cap support member, wherein when the rubber cap is pushed, the rubber cap is slid along the stick via the cap support member, the first sensor board is fixed to a lower surface of the base, a hole through which the driving pin is inserted is formed through the first sensor board, the plurality of deformation sensors is formed on the first sensor board, the second sensor board is disposed under a lower surface of the first sensor board, the metal contact and the switch member are provided on the second sensor board opposite the hole, in an initial state, a front end of the driving pin is in contact with the metal contact through the hole, and the driving pin and the rubber cap are urged upward, when the control section of the rubber cap is pushed, the rubber cap slides along the stick, and as the rubber cap slides, the driving pin slides inside the stick and in the hole of the first sensor board to reverse the metal contact for operating the switch member, and when the pushing is released, the driving pin and the rubber cap slide upward to return to the initial state due to automatic resilience of the metal contact.

13. The coordinate input device according to claim 12, wherein the stick has a support hole for the driving pin to pass through, wherein when the rubber cap is pushed, the driving pin is slid in the support hole.

14. The coordinate input device according to claim 12, wherein:
the stick is shaped in the form of a square pole;
the cap support member has a stick holding portion that can be slid along the stick while holding outer walls of the stick; and
the rubber cap has a press-fit hole that can be fitted on the stick holding portion.

15. The coordinate input device according to claim 14, wherein:
the cap support member is made of a metal plate; and
the stick holding portion can hold the outer walls of the stick by a plurality of bent side plates.

16. The coordinate input device according to claim 15, wherein each of the outer walls of the stick has a projection that is slidably fitted in a locking hole in each of the plurality of side plates of the stick holding portion.

17. The coordinate input device according to claim 15, wherein each of the plurality of side plates of the stick holding portion has a projection for preventing coming off of the rubber cap fitted on the press-fit hole.

18. The coordinate input device according to claim 12, wherein the driving pin has a columnar control shaft slidably supported by the support hole of the stick and capable of pushing the metal contact, and a pressure control section with a diameter larger than that of the control shaft, the pressure controller having projections that project from part of an outer circumference, the cap support member having a through hole for the pressure control section to partly pass through, wherein the driving pin is prevented from coming off from the through hole by the projections.

19. The coordinate input device according to claim 18, wherein the pressure controller of the driving pin has a control surface that is in contact with the ceiling of the press-fit hole of the rubber cap, a size of the control surface being larger than the outside diameter of the pressure controller.

20. The coordinate input device according to claim 19, wherein
the control surface is a controller separate from the driving pin, wherein a press-fit portion of the controller is press-fitted in a press-fit hole of the driving pin to integrate the driving pin with the controller.

21. The coordinate input device according to claim 18, wherein the stick has guide grooves on diagonals of the square pole, for the projections of the driving pin to be slidably fit in.

22. The coordinate input device according to claim 16, wherein each of the plurality of side plates of the stick holding portion has a projection for preventing coming off of the rubber cap fitted on the press-fit hole.

* * * * *